United States Patent
Smith et al.

(10) Patent No.: US 8,035,776 B2
(45) Date of Patent: Oct. 11, 2011

(54) LIQUID CRYSTAL CELL AND DISPLAY HAVING PATTERNED ELECTRODE LAYER BETWEEN AT LEAST CHOLESTERIC LIQUID CRYSTAL AND ELECTRODE

(75) Inventors: Nathan J. Smith, Oxford (GB); Paul A. Gass, Oxford (GB); James M. Ball, Woodbridge (GB); Martin D. Tillin, Abingdon (GB); Michel Sagardoyburu, Angais (FR)

(73) Assignee: Sharp Kabushiki Kaisha, Osaka (JP)

( * ) Notice: Subject to any disclaimer, the term of this patent is extended or adjusted under 35 U.S.C. 154(b) by 330 days.

(21) Appl. No.: 12/306,351

(22) PCT Filed: Jul. 3, 2007

(86) PCT No.: PCT/JP2007/063633
§ 371 (c)(1),
(2), (4) Date: Dec. 23, 2008

(87) PCT Pub. No.: WO2008/004692
PCT Pub. Date: Jan. 10, 2008

(65) Prior Publication Data
US 2009/0279023 A1    Nov. 12, 2009

(30) Foreign Application Priority Data

Jul. 7, 2006  (GB) .................................. 0613462.1

(51) Int. Cl.
*G02F 1/1335*    (2006.01)
(52) U.S. Cl. .......................................... 349/98; 362/19
(58) Field of Classification Search ............ 345/87–103, 345/214, 204, 124–125; 349/98, 117, 175, 349/56, 123–130, 62, 96, 102, 112, 119, 349/120; 359/486, 487, 490, 494, 497, 500; 362/19
See application file for complete search history.

(56) References Cited

U.S. PATENT DOCUMENTS
2,053,173 A    9/1936    Astima
(Continued)

FOREIGN PATENT DOCUMENTS
GB    2 413 394    10/2005
(Continued)

OTHER PUBLICATIONS
International Search Report for PCT/JP2007/063633, mailed Oct. 2, 2007.
(Continued)

*Primary Examiner* — Akm Ullah
(74) *Attorney, Agent, or Firm* — Nixon & Vanderhye P.C.

(57) ABSTRACT

A liquid crystal cell (5) comprises a layer (4) of cholesteric liquid crystal material; and a retarder (3) disposed in an optical path through the layer (4) of cholesteric liquid crystal material. The cholesteric liquid crystal material is switchable between a first state in which it cooperates with the retarder (3) to provide a first viewing angle range and a second state in which it cooperates with the retarder (3) to provide a second viewing angle range which is smaller than the first viewing angle range. The pitch of the cholesteric liquid crystal material is greater than an intended wavelength of operation of the liquid crystal cell divided by the average refractive index of the liquid crystal material. The liquid crystal cell may be used as a Viewing Angle Restriction (VAR) element, to enable another component, such as a display panel (6), to be operated in either a wide viewing mode or a narrow viewing mode.

18 Claims, 3 Drawing Sheets

U.S. PATENT DOCUMENTS

| | | | |
|---|---|---|---|
| 2,689,387 | A | 9/1954 | Carr |
| 3,031,351 | A | 4/1962 | McIlvaine |
| RE27,617 | E | 4/1973 | Olsen |
| 4,764,410 | A | 8/1988 | Grzywinski |
| 4,766,023 | A | 8/1988 | Lu |
| 5,147,716 | A | 9/1992 | Bellus |
| 5,528,319 | A | 6/1996 | Austin |
| 5,825,436 | A | 10/1998 | Knight |
| 5,831,698 | A | 11/1998 | Depp et al. |
| 5,877,829 | A | 3/1999 | Okamoto et al. |
| 6,211,930 | B1 * | 4/2001 | Sautter et al. .................. 349/66 |
| 6,552,850 | B1 | 4/2003 | Dudasik |
| 7,317,498 | B2 * | 1/2008 | Hara et al. ...................... 349/62 |
| 7,468,770 | B2 * | 12/2008 | Okumura ....................... 349/123 |
| 7,492,516 | B2 * | 2/2009 | Takahashi et al. ............ 359/494 |
| 7,551,239 | B2 * | 6/2009 | Fukushima et al. ............. 349/16 |
| 7,633,586 | B2 * | 12/2009 | Winlow et al. ................ 349/123 |
| 7,633,678 | B2 * | 12/2009 | Takahashi et al. ............ 359/486 |
| 7,705,933 | B2 * | 4/2010 | Matsushima ................... 349/75 |
| 7,728,801 | B2 * | 6/2010 | Tsai et al. ........................ 345/87 |
| 7,755,728 | B2 * | 7/2010 | Ichihashi et al. .............. 349/117 |
| 7,880,843 | B2 * | 2/2011 | Morishita et al. ............. 349/119 |
| 2001/0015782 | A1 | 8/2001 | Takato et al. |
| 2002/0158967 | A1 | 10/2002 | Janick et al. |
| 2002/0180922 | A1 | 12/2002 | Takato et al. |
| 2004/0100604 | A1 | 5/2004 | Takato et al. |
| 2005/0191329 | A1 * | 9/2005 | Taniguchi ..................... 424/401 |

FOREIGN PATENT DOCUMENTS

| | | |
|---|---|---|
| JP | 11-174489 | 7/1999 |

OTHER PUBLICATIONS

Great Britain Search Report for GB0613462.1, mailed Nov. 6, 2006.

Written Opinion of the International Searching Authority for PCT/JP2007/063633, mailed Oct. 2, 2007.

Hisatake et al., "31.3: Viewing Angle Controllable LCD Using Variable Optical Compensator and Variable Diffuser", SID 05 Digest p. 1218-1221.

H. Hataoh et al., "22.3: Viewing-Angle Magnification in a TN-LCD with an Ultra-Supertwisted LC Compensator" SID 92 Digest p. 401-404.

S. Pancharatnam, "Achromatic Combinations of Birefringent Plates", Proceedings of Indian Acchademy of Sciences, vol. XLI No. 4, Sec.A, pp. 130-136 (1955).

* cited by examiner

Figure 6

LIQUID CRYSTAL CELL AND DISPLAY HAVING PATTERNED ELECTRODE LAYER BETWEEN AT LEAST CHOLESTERIC LIQUID CRYSTAL AND ELECTRODE This application is the U.S. national phase of International Application No. PCT/JP2007/063633, filed 3 Jul. 2007 which designated the U.S. and claims priority to Great Britain Application No. 0613462.0, filed 7 Jul. 2006, the entire contents of each of which are hereby incorporated by reference.

TECHNICAL FIELD

The present invention relates to a liquid crystal cell that may be controlled to provide either a first viewing angle range or a second viewing angle range which is smaller than the first viewing angle. Such a liquid crystal cell may be placed, for example, in front of a display to enable the viewing angle range of the display to be controlled. The present invention also relates to a display, the viewing angle range of which may be controlled.

BACKGROUND ART

Electronic display devices, such as monitors used with computers and screens built in to telephones and portable information devices, are usually designed to have a viewing angle as wide as possible so that they can be read from any viewing position. However, there are some situations where a display which is visible from only a narrow range of angles is useful. For example, one might wish to read a private document using a portable computer while on a crowded train.

A number of devices are known which restrict the range of angles or positions from which a display can be viewed.

U.S. Pat. No. 6,552,850 discloses a technique for the display of private information on a cash-dispensing machine. Light emitted by the machine display has a fixed polarisation state and the machine and its user are surrounded by a large screen of sheet polariser which absorbs light of that polarisation state but transmits the orthogonal state. Passers by can see the user and the machine but cannot see information displayed on the screen.

Another known technique for controlling the direction of light is a 'louvred' film. The film consists of alternating transparent and opaque layers in an arrangement similar to a Venetian blind. Like a Venetian blind, it allows light to pass through it when the light is travelling in a direction nearly parallel to the layers but absorbs light travelling at large angles to the plane of the layers. These layers may be perpendicular to the surface of the film or at some other angle.

As an example, U.S. Pat. No. RE27,617 describes a polymer film which contains absorbing 'microlouvre' structures. The polar angle, q, (shown in FIG. 1, which illustrates the co-ordinate system used herein) at which privacy occurs at is a function of the louvre's height to width ratio. (In FIG. 1, the in-plane (azimuth) and out-of-plane (polar) angles are indicated as f and q, respectively; the LCD panel is assumed to lie in the x-y plane.) This film can be placed over a display to reduce the viewing angle range of the display, to give a private display mode. However, the film is not switchable so must it be physically positioned/removed to change between one viewing mode and another. Another drawback of the 3M microlouvre is that the there is never any privacy achieved in a plane parallel to the microlouvre grooves.

Louvred films may be manufactured by stacking many alternating sheets of transparent and opaque material and then cutting slices of the resulting block perpendicular to the layers. This method has been known for many years. For example, it is disclosed in U.S. Pat. Nos. 2,053,173, 2,689, 387 and 3,031,351.

A process where a louvred film is cut continuously from a cylindrical billet of stacked layers is disclosed in U.S. Pat. No. RE27,617. U.S. Pat. No. 4,766,023 shows how the optical quality and mechanical robustness of the resulting film can be improved by coating with a UV-curable monomer and then exposing the film to UV radiation. U.S. Pat. No. 4,764,410 discloses a similar process where the UV-curable material is used to bond the louvre sheet to a covering film.

Other methods exist for making films with similar properties to the louvred film. For example, U.S. Pat. No. 5,147,716 discloses a light-control film which contains many elongate particles which are aligned in the direction perpendicular to the plane of the film. Light rays which make large angles to this direction are therefore strongly absorbed.

Another example of a light-control film is disclosed in U.S. Pat. No. 5,528,319. Embedded in the transparent body of the film are two or more layers parallel to the plane of the film, each layer having opaque and transparent sections. The opaque sections block the transmission of light through the film in certain directions while allowing the transmission of light in other directions.

The films described above may be placed either in front of a display panel or between a transmissive display panel and its backlight to restrict the range of angles from which the display can be viewed. In other words, they make a display 'private'. However none of them can easily be switched off to allow viewing from a wide range of angles.

US 2002/0158967 shows how a light control film can be mounted on a display so that the light control film can be moved over the front of the display to give a private mode or mechanically retracted into a holder behind or beside the display to give a public mode. This method has the disadvantages that it contains moving parts which may fail or be damaged and which add bulk to the display.

Another known technique for switching between public and private mode with no moving parts is to mount a light control film behind a display panel and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect. Switchable privacy devices of such type are described in U.S. Pat. Nos. 5,831,698, 6,211, 930 and 5,877,829. They share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public than in private mode unless the backlight is made brighter to compensate.

A third known technique for providing a switchable public/private display is disclosed in U.S. Pat. No. 5,825,436. The light control device in this patent is similar in structure to the louvred film described earlier. However, each opaque element in the louvred film is replaced by a liquid crystal cell which can be electronically switched from an opaque state to a transparent state. The light control device is placed in front of or behind a display panel. When the cells are opaque, the display is in its private mode; when the cells are transparent, the display is in its public mode.

A first disadvantage of this method is difficulty and expense of manufacturing liquid crystal cells with an appropriate shape. A second disadvantage is that in the private mode, a ray of light may enter at an angle such that it passes first through the transparent material and then through part of a liquid crystal cell. Such a ray will not be completely absorbed by the liquid crystal cell and this may reduce the privacy of the device.

JP2003-233074 discloses a liquid crystal display which provides a conventional display of images from normal viewing angles. However, for relatively large viewing angles away from the normal to the display, a fixed image is displayed and this may be used to hide or "scramble" the normal image so as to provide a privacy mode of operation. The fixed image is achieved by having display regions with different alignment directions from each other, although all pixels operate in the same mode. A lower than normal drive voltage is used.

Although such an arrangement may be used to provide a privacy mode, it is not switchable. In particular, the relatively narrow range of viewing angles throughout which the non-fixed image can be seen cannot be changed if non-private operation is desired.

SID 05 Digest p1218 (Toshiba) discloses a display in which a liquid crystal layer for image display and an Ultra-Super Twisted (UST) liquid crystal layer are disposed between an entrance polariser and an exit polariser. The liquid crystal layers are illuminated by a backlight, and a switchable diffuser is provided between the backlight and the entrance polariser. The display may be switched between a wide display mode and a narrow display mode by switching both the UST liquid crystal layer and the switchable diffuser.

SID 92 Digest p401 (Toshiba) discloses an UST liquid crystal layer used to improve the viewing angle range of a TN liquid crystal display. However, the UST layer is not switched to alter the viewing angle range of the display.

GB 2 413 394 discloses a display having a display device and an additional liquid crystal display device that can be switched to control the viewing angle range of the display. The additional liquid crystal display device generally has an ECB (electrically controlled birefringence) liquid crystal layer, but in one embodiment the additional liquid crystal display device includes a cholesteric liquid crystal layer.

DISCLOSURE OF INVENTION

A first aspect of the present invention provides a liquid crystal cell comprising: a retarder; and a layer of cholesteric liquid crystal material disposed in an optical path through the retarder; wherein the cholesteric liquid crystal material is switchable between a first state in which it cooperates with the retarder to provide a first viewing angle range and a second state in which it cooperates with the retarder to provide a second viewing angle range which is smaller than the first viewing angle range; and wherein the pitch of the cholesteric liquid crystal material is greater than an intended wavelength of operation of the liquid crystal cell divided by the average refractive index of the liquid crystal material.

Bragg reflection will occur in the layer of cholesteric liquid crystal material if the following condition is satisfied:

$$\lambda = n_{av} \times p \qquad (1)$$

In equation (1), 1 denotes the wavelength of light, $n_{av}$ is the average refractive index of the liquid crystal material, and p is the pitch of the liquid crystal material. The average refractive index of the liquid crystal material is given by $n_{av} = \frac{1}{3}(2n_o + n_e)$, where $n_o$ and $n_e$ are the ordinary and extraordinary refractive indices. For most liquid crystal materials, $n_{av} \approx 1.5$.

In the display of GB 2 413 394, the cholesteric liquid crystal layer has a pitch that is smaller than the intended wavelength of operation of the display. In contrast, in the liquid crystal cell of the present invention, the pitch of the cholesteric liquid crystal material is greater than an intended wavelength of operation of the liquid crystal cell divided by the average refractive index of the liquid crystal material. Conventional teachings suggest that good optical performance can only be attained when the pitch of the cholesteric liquid crystal material is shorter than the wavelength of operation—it has previously been thought that, where a liquid crystal layer has been used a switchable retarder to compensate a fixed retarder, the liquid crystal must have a pitch lower than the critical pitch $p_{crit}$ at which $\lambda = n_{av} \times p_{crit}$. The inventors have however found that the liquid crystal may have a pitch greater than the critical pitch $p_{crit}$ and still provide good optical performance.

Moreover, it has also been found that significantly faster switching of the liquid crystal layer is achieved when the pitch of the cholesteric liquid crystal material is greater than the critical pitch $p_{crit}$, rather than less as in GB 2 413 394. This increased switching speed enables a liquid crystal cell of the invention to operate on acceptable timescales. The present invention thus provides a liquid crystal cell that may for example be used as a VAR (viewing angle restriction) element for varying the viewing angle of a display, and that has optical properties that are as good as the optical properties of the display of GB 2 413 394, but that has an increased switching speed.

The retarder may be a fixed retarder. It may be a negative c-plate or a positive c-plate.

The pitch of the cholesteric liquid crystal material may be equal to or greater than 500 nm. A liquid crystal material typically has an average refractive index of approximately 1.5, so making the pitch of the cholesteric liquid crystal material 500 nm or greater ensures that the pitch of the cholesteric liquid crystal material is greater than wavelength divided by the average refractive index of the liquid crystal material for all wavelengths in the visible region of the spectrum (which covers the approximate wavelength range of 400 nm to 700 nm).

The pitch of the cholesteric liquid crystal material may be equal to or greater than 700 nm. It may be equal to or greater than 1000 nm. These pitches again satisfy the requirement that the pitch of the cholesteric liquid crystal material is greater than wavelength divided by the average refractive index of the liquid crystal material for all wavelengths in the visible region of the spectrum.

The pitch of the cholesteric liquid crystal material may be less than 25 microns. If the pitch were greater, the resultant cell would be very thick given that (as explained below) a twist angle of 300° or above is desirable to obtain good privacy, and so would require a high voltage for operation. A pitch of 25 microns corresponds, for example, the case of a 360° twist angle across a layer of cholesteric liquid crystal material having a thickness of 25 microns.

The twist angle of the cholesteric liquid crystal material may be greater than 300°. It may be less than 3600°. If the twist angle is less than 300°, a good privacy metric may not be obtained. If the twist angle is greater than 3600°, the required switching voltage and switching times may not be practical for commercial applications.

The layer of cholesteric liquid crystal material may be patterned. This allows one or more parts of the layer of cholesteric liquid crystal material to be switched to the second state, while one or more other parts of the layer of cholesteric liquid crystal material remain in the first state.

The layer of cholesteric liquid crystal may be disposed between a first electrode layer and a second electrode layer; and a patterned electrode layer may be disposed between the layer of cholesteric liquid crystal material and the second electrode layer. This is a convenient way of obtaining a patterned layer of cholesteric liquid crystal material while avoiding on-axis viewing artefacts.

The liquid crystal cell may further comprise an entrance polariser and an exit polariser, and the retarder and the layer of cholesteric liquid crystal material may be disposed between the entrance polariser and the exit polariser.

The entrance polariser and exit polariser may be elliptical polarisers with an ellipticity of greater than zero. As is known, linear polarisation and circular polarisation are special cases of "elliptical polarisation", with linear polarisation corresponding to an ellipticity of zero and circular polarisation corresponding to an ellipticity of one. Similarly, a linear polariser and circular polariser are special cases of an "elliptical polariser", with a linear polariser corresponding to an ellipticity of zero and a circular polariser corresponding to an ellipticity of one.

The entrance polariser and exit polariser may be circular polarisers. They may be achromatic circular polarisers. Alternatively, they may each comprise a linear polariser and a quarterwave plate.

The handedness of the entrance polariser may be opposite to the handedness of the pitch liquid crystal material.

The entrance polariser and exit polariser may be linear polarisers.

A second aspect of the invention provides a liquid crystal cell comprising: an entrance polariser; an exit polariser; and a layer of cholesteric liquid crystal material disposed between the entrance polariser and the exit polariser; wherein the pitch of the cholesteric liquid crystal material is greater than an intended wavelength of operation of the liquid crystal cell divided by the average refractive index of the liquid crystal material; and wherein each of the entrance polariser and the exit polariser is an elliptical polariser with an ellipticity of greater than zero.

It has been found that a particularly good private viewing mode may be obtained when circularly polarised light, or elliptically polarised light with a non-zero ellipticity, passes through the liquid crystal layer, as compared to when linearly polarised light passes through the liquid crystal layer.

In the liquid crystal cell of the first aspect, the retarder is provided to prevent, or reduce, colouring effects when the liquid crystal material is switched to give a wide display mode. In principle, the retarder may be omitted, for example if the liquid crystal cell is for use in an application in which colouring effects can be tolerated or if a retarder is placed elsewhere in the optical path.

Each of the entrance polariser and the exit polariser may be a circular polariser.

A third aspect of the present invention provides a display comprising: a display device which is controllable to provide image display; and a liquid crystal cell disposed in the path of light from the display; wherein the liquid crystal cell is a liquid crystal cell of the first or second aspect.

The display device may emit, in use, polarised light.

Alternatively, the display device may emit, in use, unpolarised light and the display may further comprise a further polariser provided between the display device and the liquid crystal cell.

The display device may emits in use, light of a first polarisation and the display may comprises polarisation conversion means, provided between the display device and the liquid crystal cell, for converting light emitted by the display device to a second polarisation different from the first polarisation.

The first polarisation may be a linear polarisation and the second polarisation may be an elliptical polarisation.

The first polarisation may be a linear polarisation and the second polarisation may be a circular polarisation.

The polarisation conversion means may comprise a quarterwave plate.

A fourth aspect of the present invention provides a display comprising: an image display layer which is controllable to provide image display; a retarder; and a cholesteric liquid crystal layer; wherein the cholesteric liquid crystal layer is switchable between a first state in which it cooperates with the retarder to provide a first viewing angle-range and a second state in which it cooperates with the retarder to provide a second viewing angle range which is smaller than the first viewing angle range; and wherein the pitch of the cholesteric liquid crystal layer greater than an intended wavelength of operation of the display divided by the average refractive index of the liquid crystal material.

The display device may further comprise an exit polariser.

The display device may further comprise an entrance polariser, the image display layer, the retarder and the cholesteric liquid crystal layer being disposed between the entrance polariser and the exit polariser.

The retarder may be a fixed retarder. It may be a negative c-plate, or a positive c-plate.

The pitch of the cholesteric liquid crystal material may be equal to or greater than 500 nm. It may be equal to or greater than 700 nm. It may be equal to or greater than 1000 nm.

The pitch of the cholesteric liquid crystal material may be less than 25 microns.

The twist angle of the cholesteric liquid crystal material may be greater than 300°. It may be less than 3600°.

The layer of cholesteric liquid crystal material may be patterned.

Each of the entrance polariser and the exit polariser may be an elliptical polariser with an ellipticity of greater than zero. Each of the entrance polariser and the exit polariser may be a circular polariser. It has been found that a particularly good private viewing mode may be obtained when circularly polarised light, or elliptically polarised light with a non-zero ellipticity, passes through the liquid crystal layer, as compared to when linearly polarised light passes through the liquid crystal layer.

The layer of cholesteric liquid crystal may be disposed between a first electrode layer and a second electrode layer; and a patterned electrode layer may be disposed between the layer of cholesteric liquid crystal material and the second electrode layer.

Additional objects, features, and strengths of the present invention will be made clear by the description below. Further, the advantages of the present invention will be evident from the following explanation in reference to the drawings.

BRIEF DESCRIPTION OF DRAWINGS

Preferred embodiments of the present invention will now be described by way of illustrative example with reference to accompanying figures in which.

BEST MODE FOR CARRYING OUT THE INVENTION

Figure 1:
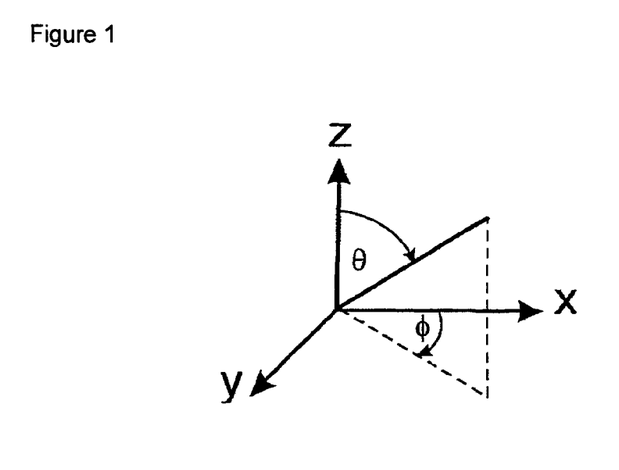
FIG. 1 illustrates the co-ordinate system used in this application.

FIG. 1 illustrates the co-ordinate system used in this application. It is assumed that a display face is parallel to the x-y plane, and that light propagates generally along the z-direction. The out-of-plane angle, or polar angle, represents the angle between a direction and the z-axis, and is denoted by q. The in-plane angle, or azimuth angle, represents the angle between the x-axis and a projection of a direction on the x-y plane, and is denoted by f.

Figure 2:
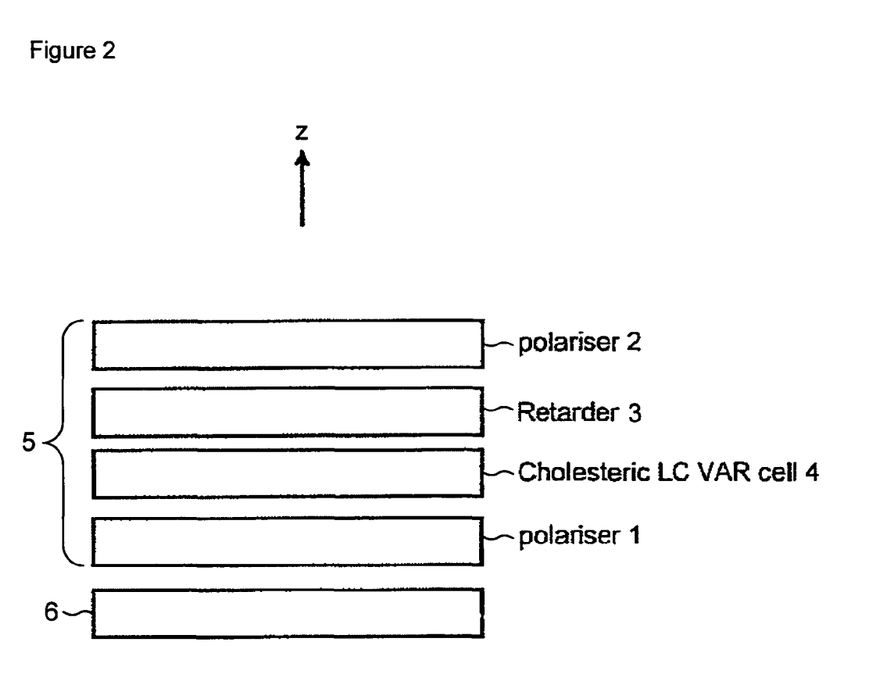
FIG. 2 is a schematic sectional view of a liquid crystal cell according to an embodiment of the present invention.

FIG. 2 is a schematic sectional view of a liquid crystal cell 5 of the present invention. The liquid crystal cell 5 comprises a cholesteric liquid crystal cell 4 and a retarder 3 and disposed in an optical path through the cholesteric liquid crystal cell 4. The cholesteric liquid crystal cell 4 contains a layer of cholesteric material disposed between upper and lower transparent substrates (not shown). Other components of the cholesteric liquid crystal cell 4 such as, for example, electrodes to allow the layer of cholesteric liquid crystal material to be addressed are also omitted from FIG. 2 for clarity.

In FIG. 2 the liquid crystal cell 5 is shown disposed over a display panel 6. The display panel 6 may be any pre-existing display panel such as, for example, a liquid crystal display panel (for example, a twisted nematic liquid crystal display panel, a super-twisted nematic liquid crystal display panel, or an ASV (advanced super view_liquid crystal display panel). The nature of the display panel 6 is not material to the invention, and the display panel will therefore not be described in detail. The display panel 6 may be an emissive display panel, a transmissive display panel that is illuminated by a backlight (not shown), or a reflective display panel.

The cholesteric liquid crystal layer of the liquid crystal cell 5 is switchable between at least a first liquid crystal state and a second liquid crystal state. In the first liquid crystal state, the cholesteric liquid crystal material does not change an image displayed on the display panel 6, so that an image displayed on the display panel 6 may be viewed over a wide viewing range, thereby providing a public display mode. In the second liquid crystal state, however the cholesteric liquid crystal material changes in some way an image displayed on display panel 6 as viewed from an off-axis direction, while having little or no effect on the image as viewed along the axis of the display panel 6, so as to provide a private display mode. Switching between the public display mode and the private display mode is achieved by switching the electric field applied across the cholesteric liquid crystal cell 4 so as to switch the layer of cholesteric liquid crystal material between the first liquid crystal state and the second liquid crystal state. The liquid crystal cell 5 thus acts as a viewing angle restriction (VAR) element, that allows the viewing angle of the image display panel 6 to be controlled to provide a private display mode and a public display mode.

The retarder 3 is a fixed retarder, and acts as an optically anisotropic compensating layer so as to negate the effect of the cholesteric liquid crystal cell 4 on light propagating in an off-axis direction during the public display mode. The provision of the retarder ensures that a good public display mode, in which an image displayed on the display panel 6 is visible over a wide viewing angle range, may be obtained.

In the private mode, light from the display panel 6 is blocked for all azimuthal angles over a range of the polar angle q. The range of polar angles over which light is blocked for all azimuth angles typically has an extent of around 20°. The centre of the range of polar angles over which light is blocked for all azimuth angles is dependent on the overall retardation of the cholesteric liquid crystal cell 4 and the retarder 3—the polar angle q at which the liquid crystal cell 5 has the greatest effect on an image displayed on the display panel 6 is determined by the total combined retardation of the cholesteric liquid crystal cell 4 and the retarder 3. An increase in the total retardation of the cholesteric liquid crystal cell 4 and the retarder 3 will decrease the polar angle about which the range of polar angles for which light is blocked over all azimuth angles is centred. An increase in the total retardation of the cholesteric liquid crystal cell 4 and the retarder 3 will also decrease the polar angle at which the privacy metric shown in FIG. 3 has a maximum.

In a preferred embodiment the retarder 3 is a c-plate retarder. In this embodiment the retarder 3 may be either a negative c-plate retarder or a positive c-plate retarder. Use of a negative c-plate retarder will provide a liquid crystal cell 5 that provides a private display mode when no voltage is applied across cholesteric liquid crystal cell and that provides a public display mode when a suitable voltage is applied across the cholesteric liquid crystal cell 4. Use of a positive c-plate retarder will, in contrast, provide a liquid crystal cell 5 that provides a public display mode when no voltage is applied across the cholesteric liquid crystal cell 4, and that provides a private display mode when a suitable voltage is applied across the cholesteric liquid crystal cell 4.

In a liquid crystal cell 5 that uses a negative c-plate retarder, when no voltage is applied across the cholesteric liquid crystal cell 4 the combined optical operation of the cholesteric liquid crystal layer and the negative c-plate retarder produces a private display mode, as explained above. When a suitable voltage is applied across the cholesteric liquid crystal layer, the optic axis of the liquid crystal material is re-oriented to lie parallel to the applied electric field, so that the liquid crystal molecules align themselves perpendicular to the substrates of the cholesteric liquid crystal cell 4 and parallel to the z-axis—and the cholesteric liquid crystal layer thus forms a positive c-plate retarder. In this switched state, the negative c-plate retarder 3 negates the retarder effect of the cholesteric liquid crystal layer, so that the overall retardation of the cholesteric liquid crystal cell 4 and the retarder 3 is substantially zero and hence a public display mode is obtained.

In a liquid crystal cell 5 that comprises a positive c-plate retarder as the retarder 3, the retardation of the cholesteric liquid crystal layer when no voltage is applied is negated by the positive c-plate retarder, and hence a public display mode is obtained. When a suitable voltage is applied across the cholesteric liquid crystal layer, the liquid crystal molecules re-orient themselves to lie parallel to the applied electric field, so that the molecules are aligned perpendicular to the substrates of the cholesteric liquid crystal cell 4 and parallel to the z-axis—and the cholesteric liquid crystal layer thus forms a positive c-plate. In this switched state, the retardation of the cholesteric liquid crystal layer adds to the retardation of the positive c-plate retarder 3, and the cholesteric liquid crystal layer and the positive c-plate retarder thus combine to provide a private display mode.

The degree of privacy that may be obtained in the private display mode can be enhanced by spatially patterning the regions of the liquid crystal cell 5 in which the privacy function is activated. This can be done by patterning the cholesteric liquid crystal layer 4, so that parts of the cholesteric liquid crystal layer may be switched while other parts remain unswitched. This may be done, for example by suitably patterning the electrodes that drive the cholesteric liquid crystal layer.

The spatial patterns may be, for example, geometric patterns (such as a chequerboard, lines, etc.) or text. The geometric patterns may be periodic or non-periodic, and the patterns or text may form part of an optical illusion.

In the embodiment of FIG. 2 the retarder 3 is placed in front of the cholesteric liquid crystal cell 4, so that the retarder 3 will be closer to an observer than the cholesteric liquid crystal cell 4. This is not, however, necessary, and the order of the retarder 3 and the cholesteric liquid crystal cell 4 may be interchanged so that the retarder 3 is behind the cholesteric liquid crystal cell 4.

Similarly, FIG. 2 shows the liquid crystal cell 5 disposed in front of the display panel 6, so that the liquid crystal cell 5 is between the display panel 6 and an observer. In the case of a transmissive image display panel 6 this is not, however, necessary, and the liquid crystal cell 5 may alternatively be disposed behind the display panel 6.

Optimum optical performance of the liquid crystal cell 5 has been found to occur when the liquid crystal cell 5 is used in conjunction with circularly polarised light. In the embodiment shown in FIG. 2, therefore, the retarder 3 and the cholesteric liquid crystal cell 4 are disposed between an entrance polariser 1 and an exit polariser 2. In one embodiment, the entrance polariser 1 and the exit polariser 2 are both circular polarisers. This embodiment is suitable for use with a display panel 6 that emits unpolarised light. It has been found that the use of circularly polarised light provides a privacy function that is substantially independent of the azimuth angle 5 for a given polar angle q.

Where the entrance polariser 1 and the exit polariser 2 are circular polariser, they each may comprise an achromatic circular polariser. One example of an achromatic circular polariser is a Pancharatnam circular polariser that uses more than one waveplate in conjunction with a linear polariser to achieve chromatic circular polarisation—see S. Pancharatnam in "Achromatic Combinations of Birefringent Plates", Proceedings of Indian Academy of Sciences, Vol. XLI No. 4, Sec.A, pp 130-136 (1955).

Alternatively, where the entrance polariser 1 and the exit polariser 2 are circular polarisers, they may each comprise a linear polariser and a single quarter waveplate. Use of a linear polariser and a single quarter waveplate provides a circular polariser that is more chromatic, but that is cheaper to manufacture.

As noted above, use of a circular polariser for the entrance polariser 1 is appropriate when the liquid crystal cell 5 is disposed in front of a display panel that emits unpolarised light, or is disposed behind a transmissive display panel and is illuminated by a source of unpolarised light. However, some displays emit light that is polarised. When a liquid crystal cell of the invention is intended for use in front of a display panel that emits polarised light having a first polarisation, the entrance polariser 1 may be replaced by a polarisation conversion element that converts polarised light from the display to polarised light having a second, different polarisation.

In particular, when a liquid crystal cell of the invention is intended for use in front of a display panel that emits linearly polarised light (such as many liquid crystal displays), the entrance polariser 1 may be replaced by a polarisation conversion element that converts linearly polarised light to circularly polarised light. A quarter waveplate is one example of a suitable polarisation conversion element.

A liquid crystal cell 5 in which the input polariser 1 of FIG. 2 is replaced by a polarisation conversion element is also suitable for an application in which the liquid crystal cell 5 is intended to be placed behind a display panel, and to be illuminated by a source of polarised light.

While the use of circularly polarised light provides a privacy function that is substantially independent of the azimuth angle f, a liquid crystal cell 5 of the invention is not restricted to use with circularly polarised light. A liquid crystal cell 5 of the invention may alternatively be used with, for example, linearly polarised light. For such an application, the entrance polariser 1 and exit polariser 2 shown in FIG. 2 would be linear polarisers rather than circular polarisers. Indeed, in an application where the liquid crystal cell 5 is disposed in front of a display panel that emits linearly polarised light (or is placed behind a display and is illuminated by linearly polarised light), the entrance polariser 1 may be omitted.

Moreover, in general, a liquid crystal cell 5 of the invention may be used with polarised light of any ellipticity.

It can be seen that the combination of the liquid crystal cell 5 and display 6 of FIG. 2 will includes a number of polarisers. The display 6 will typically be a liquid crystal display and, as is well-known, a transmissive liquid crystal display generally comprises a layer of liquid crystal material disposed between one linear polariser and another linear polariser, or a layer of liquid crystal material disposed between one circular polariser and another circular polariser. In addition the liquid crystal cell 5 will contain at least one further polariser. By placing the liquid crystal cell 5 outside the polarisers of the display device 6, and using at least one further polariser, an off-axis image in the private display mode can be made very dark, almost black. This mechanism for providing a private display mode is quite different to the mechanism for providing a private display mode when a cholesteric liquid crystal cell is disposed between the polarisers of a display panel as in SID 05 Digest p1218 (Toshiba). (When a cholesteric liquid crystal cell is disposed between the polarisers of a display panel, a private display mode is obtained by disrupting the grey level curve of the display for an off-axis image.)

In an embodiment in which the liquid crystal cell 5 operates with circularised polarised light, the handedness of the circular polarised light incident on the cholesteric liquid crystal layer is preferably of opposite handedness to the cholesteric liquid crystal layer, and the handedness of the input polariser may be chosen so as to achieve this. It has been found that this increases the amplitude of the peaks in the metric of privacy shown in FIG. 3. However, the invention is not limited to this, and the handedness of the circular polarised light may be of the same as the handedness of the cholesteric liquid crystal material.

More generally, when the liquid crystal cell 5 is used with elliptically polarised light, the handedness of the elliptically polarised light incident on the cholesteric liquid crystal layer is preferably of opposite handedness to the handedness of the cholesteric liquid crystal material and the handedness of the input polariser may be chosen so as to achieve this, although the handedness of the elliptically polarised light may be the same as the handedness of the cholesteric liquid crystal material.

In the liquid crystal cell of the FIG. 2, the retarder 3 is provided to prevent, or reduce, colouring effects when the liquid crystal material 4 is switched to give a wide display mode. In principle, the retarder 3 could be omitted from the liquid crystal cell 5, for example if the liquid crystal cell 5 is for use in an application in which colouring effects can be tolerated or if a retarder is placed elsewhere in the optical path.

As noted above, according to the present invention the pitch of the cholesteric liquid crystal material in the cholesteric liquid crystal cell 4 is greater than the intended wavelength of operation of the liquid crystal cell 5 divided by the average refractive index of the liquid crystal material, so that the pitch is greater than the pitch at which Bragg reflection will occur in the layer of cholesteric liquid crystal material.

Where the liquid crystal cell 4 is intended for use with a monochromatic display panel 6, for example a monochromatic display panel for an automatic teller machine, the pitch of the cholesteric liquid crystal material may be any value that is greater than the display wavelength of the monochromatic display panel divided by the average refractive index of the liquid crystal material. Where, however, the liquid crystal cell 5 is intended for use with a polychromatic display, such as a full colour display, the pitch of the cholesteric liquid crystal material must be greater than the pitch at which Bragg reflection will occur in the layer of cholesteric liquid crystal material for every wavelength in the image. In the case of a full colour display the pitch is preferably greater than approximately 500 nm so that Bragg reflection does not occur for any wavelength of the visible spectrum (which approximately covers the wavelength range 400 nm-700 nm). The pitch of the cholesteric liquid crystal material may however be greater than this, and for example may be greater than 700 nm or may be greater than 1000 nm.

In choosing the pitch of the cholesteric liquid crystal material, it should be noted that the liquid crystal layer becomes harder to switch as the number of twists (i.e., the total twist angle of the liquid crystal divided by 360°) in the liquid crystal layer increases. While a liquid crystal layer with 3-4 twists can be switched relatively easily, a liquid crystal layer with 6 twists is harder to switch. The pitch is therefore preferably chosen such that the liquid crystal layer has fewer than 10 twists (i.e., has a total twist of no more than 3600°), and preferably has fewer than 6 twists. In a particularly preferred embodiment, the pitch of the liquid crystal is chosen so that the liquid crystal layer has 3-4 twists (i.e., has a total twist angle of 1080° to 1440°).

The largest possible pitch of the cholesteric liquid crystal material is around 25 mm. This corresponds to a liquid crystal layer having a thickness of 25 mm, and having a single twist (ie, having a twist angle of 360°). Use of a liquid crystal layer with a thickness of over 25 mm may be undesirable, as a large voltage would be required to switch the liquid crystal layer, and a typical thickness for the liquid crystal layer would be from 3 mm to 15 mm.

In one preferred embodiment, the liquid crystal layer had thickness of 7 mm, and had a pitch of 2 mm, giving 3.5 twists for a total twist angle of 1260° (this may alternatively be considered as giving a d/p ratio of 3.5, where d is the thickness of the liquid crystal layer and p is the pitch). This was found to give a good private viewing mode.

The total twist angle of the cholesteric liquid crystal material in the cholesteric liquid crystal cell 4 is preferably greater than 300°. If the twist angle is less than 300°, a good privacy metric may not be obtained.

As explained above, a liquid crystal cell 5 of the present invention has a privacy function that, for a range of polar angles, is substantially independent of the azimuth angle, so that a private viewing mode can be obtained for all azimuth angles. In contrast, a privacy device that uses an ECB liquid crystal layer can provide a private display mode over only a limited range of azimuth angles, typically over approximately 80° of azimuth. With an ECB privacy device, it is therefore possible for undesired persons to be able to view private materials from some viewing angles. A liquid crystal cell 5 of the present invention therefore provides greater security against viewing by undesired individuals.

Figure 3:
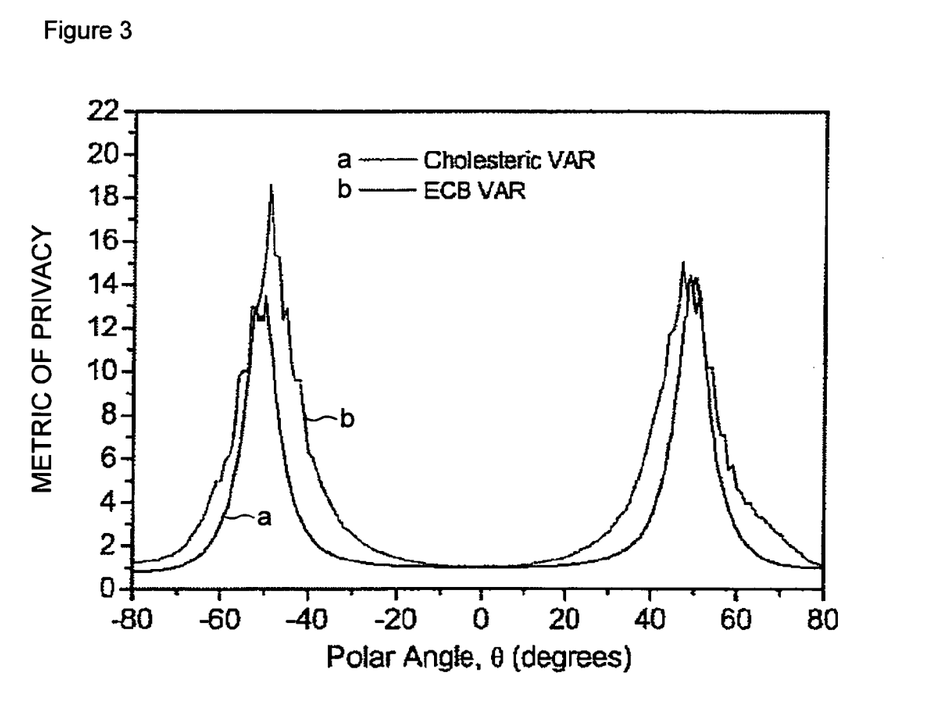
FIG. 3 shows the contrast of a liquid crystal cell of the present invention and a conventional ECB liquid crystal cell as a function of the polar angle.

Furthermore, a liquid crystal cell 5 of the present invention has reduced on-axis pattern visibility, and is therefore better suited to providing a private display mode for a large area display than an ECB privacy device. This is because the variation of contrast with polar angle has a different form for a cholesteric liquid crystal cell than for an ECB privacy device. This is shown in FIG. 3. In FIG. 3, trace (a) shows a metric of the degree of privacy provided by a liquid crystal cell 5 of the invention against polar angle whereas trace (b) shows the same metric for an ECB privacy element. The metric is the luminance in the public mode divided by the luminance in the private mode. It can be seen that, for polar angles of ±30° the ECB cell provides appreciable privacy, whereas the privacy provided by the cholesteric cell is close to 1 (i.e., the cholesteric cell provides no privacy at polar angles of ±30°. Consequently, a liquid crystal cell of the invention may be implemented with a large area display, since an observer viewing the display on-axis will not observe privacy artefacts at the periphery of the display. In contrast, someone viewing a large area display that is provided with an ECB privacy cell, may see privacy artefacts at the periphery of the display as the viewing angle to the edges of the display may be of the order of 30°—and, as shown by trace (b) of FIG. 3, an ECB cell provides appreciable privacy at these viewing angles.

Figure 4:
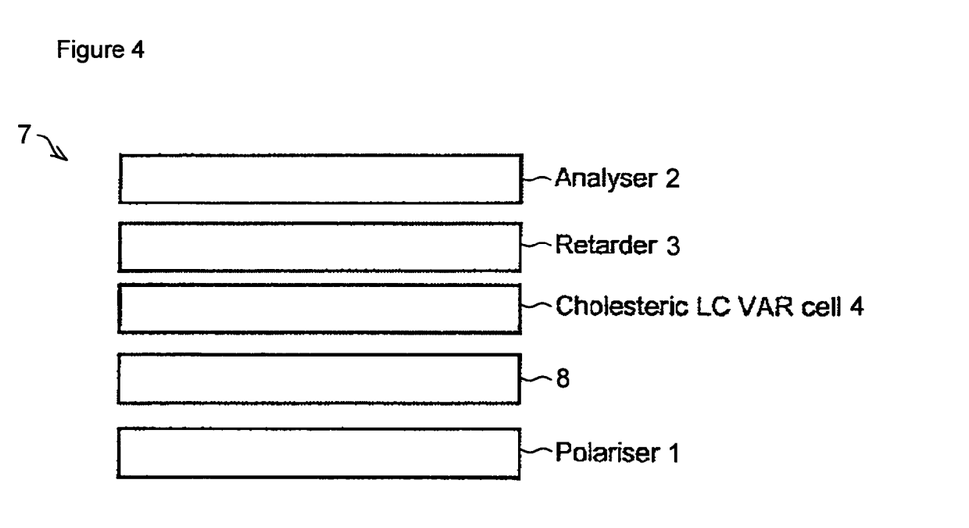
FIG. 4 is a schematic sectional view of a display according to the present invention.

FIG. 4 shows a display 7 according to a further embodiment of the present invention. In this embodiment, the cholesteric liquid crystal cell 4 and retarder 3 are incorporated into a display 7, between the input polariser 1 and the exit polariser 2 of the display. In contrast, the embodiment of FIG. 2 provides a free-standing liquid crystal cell that may be used as a VAR element in conjunction with a pre-existing display.

The display 7 comprises an image display layer 8, disposed between the input polariser 1 and the exit polariser or analyser 2. A retarder 3 and a cholesteric liquid crystal cell 4 are disposed between the image display layer 8 and one of the input and exit polarisers 1, 2. In FIG. 4 the retarder 3 and cholesteric liquid crystal cell 4 are disposed between the image display layer 8 and the exit polariser 2, but they could alternatively be disposed between the input polariser 1 and the image display layer 8. Moreover, in FIG. 4 the retarder 3 is shown disposed in front of the cholesteric liquid crystal cell 4, but the retarder 3 may be alternatively be disposed behind the cholesteric liquid crystal cell 4. In general, the position of the retarder 3, the cholesteric liquid crystal cell 4 and the image display layer 8 are interchangeable.

The principle of operation of the display 7 of FIG. 4 is generally similar to that of the liquid crystal cell 5 of FIG. 2. The molecules of the cholesteric liquid crystal layer may be switched between a first state which provides a public display mode for the display 7 and a second state which provides a private display mode having a reduced viewing angle range. When the cholesteric liquid crystal material is switched to the second state, light transmitted through the display 7 undergoes contrast inversion for all azimuth angles over a particular range of polar angles, (for example for polar angles in the range of from 40° to 60°). An observer viewing the display 7 from a viewing angle within the range where contrast inversion occurs is unable to make out the image displayed on the image display layer 8, and a private mode is therefore obtained.

The cholesteric liquid crystal cell 4 and the retarder 3 of the display 7 of FIG. 4 are generally similar to the cholesteric liquid crystal cell 4 and retarder 3 of FIG. 2, and their detailed description will not be repeated here.

The display of FIG. 4 is suitable for use with a backlight that provides unpolarised light, as the light from the backlight will be polarised by the input polariser 1 of the display 7. In principle, if the display 7 is illuminated by polarised light, the input polariser 1 may be omitted.

The embodiment of FIG. 4 has been described with reference to a display having a transmissive image display layer 8. This embodiment may alternatively provide a display having an emissive display layer, in which the cholesteric liquid crystal cell 4 and retarder 3 are incorporated into the display. In this case the cholesteric liquid crystal cell 4 and retarder 3 must be disposed in front of the emissive display layer. The input polariser 1 of FIG. 4 would not be required, but either the emissive display layer must emit polarised light or a polariser must be provided over the emissive display layer.

The embodiment of FIG. 4 may also be applied to a reflective display.

As explained above, the degree of privacy that may be obtained in the private display mode can be enhanced by spatially patterning the regions of the liquid crystal cell 5 in which the privacy function is activated, for example by suitably patterning the electrodes that drive the cholesteric liquid crystal layer. This may, however, lead to degradation of the public display mode, as will be explained with reference to FIG. 5.

Figure 5:
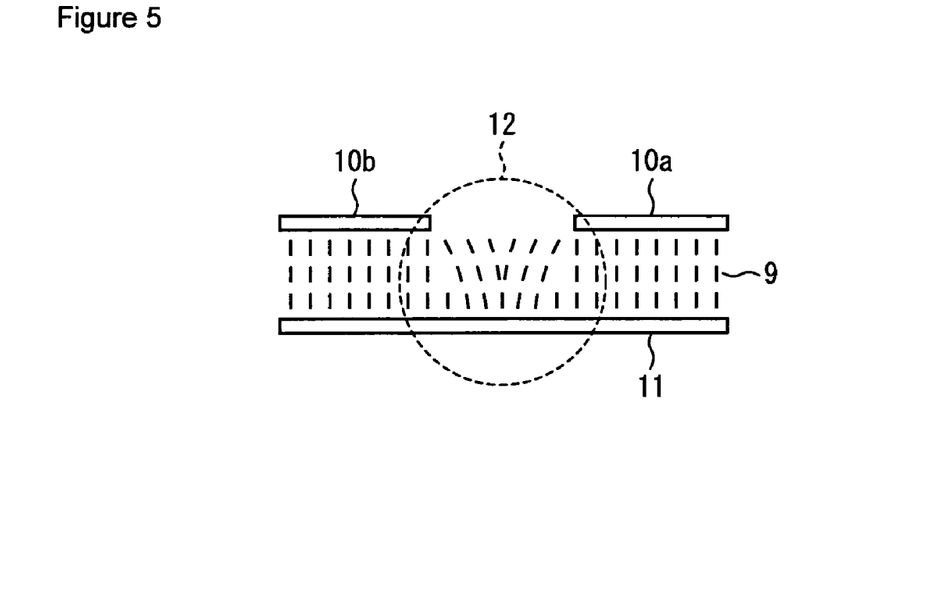
FIG. 5 is a cross-sectional view of a liquid crystal cell illustrating generation of an on-axis artefact.

FIG. 5 is a schematic cross-section through a cholesteric liquid crystal cell, suitable for use as the cholesteric liquid crystal cell 4 of the liquid crystal cell 5 of FIG. 2. The liquid crystal cell has a layer of cholesteric liquid crystal material 9 disposed between a lower electrode layer 11 and an upper electrode layer. The upper electrode layer is patterned, to enhance the degree of privacy obtained in the private display mode, and two independently addressable upper electrodes 10a, 10b included in the upper electrode layer are shown in FIG. 5. The intention is that, in the private display mode, different voltages will be applied to the upper electrodes 10a, 10b, for example so that the region of the liquid crystal layer corresponding to one electrode 10a is switched while the region of the liquid crystal layer corresponding to another electrode 10b remains unswitched. The lower electrode layer 11 in FIG. 5 is a continuous, unpatterned electrode layer.

Patterning the upper electrode layer has the effect that, as can be seen in FIG. 5, there is a region 12 of the liquid crystal layer 9 that is not directly covered by any of the upper electrode 10a,10b. As a result, when it is intended to apply to switch the liquid crystal layer uniformly over its entire area (eg, to give the public display mode in a cell that uses a negative c-plate retarder) and the same voltage is applied to both upper electrodes 10a,10b, the electric field in the region 12 of the liquid crystal layer 9 that is not covered by an upper electrode 10a, 10b is different, both in magnitude and direction, to the electric field in regions of the liquid crystal layer 9 that are covered by the upper electrodes 10a, 10b. This is indicated by the short lines in FIG. 5, which denote the average liquid crystal molecular direction, which is parallel to the direction of the electric field vector. Because the electric field in the region 12 of the liquid crystal layer 9 that is not covered by an upper electrode is different to the electric field in regions of the liquid crystal layer 9 that are covered by the upper electrodes 10a,10b, the liquid crystal alignment in the region 12 of the liquid crystal layer 9 that is not covered by an upper electrode may be different from the liquid crystal alignment in regions of the liquid crystal layer 9 that are covered by the upper electrodes 10a, 10b—so the region 12 of the liquid crystal layer 9 that is not covered by an upper electrode to have different optical properties from regions of the liquid crystal layer 9 that are covered by the upper electrodes 10a, 10b. This difference in optical properties will lead to a viewing artefact that is visible on-axis, and that will degrade the viewing quality of the public mode.

Figure 6:
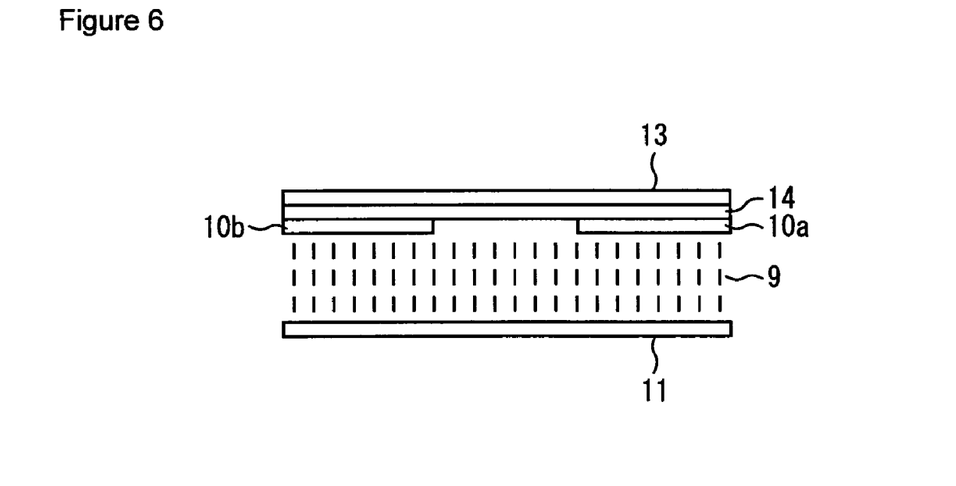
FIG. 6 is a cross-sectional view of a modified liquid crystal cell in which generation of an on-axis artefact does not occur.

FIG. 6 is a schematic cross-section of a liquid crystal cell 4 which has been modified to eliminate the on-axis viewing artefact in the public display mode. As can been seen, a second, continuous upper electrode layer 13 is present, on the opposite side of the first upper electrodes 10a, 10b to the liquid crystal layer. An electrically insulating layer 14, for example a dielectric layer, is disposed between the continuous upper electrode layer 13 and the electrodes 10a,10b. The second, continuous upper electrode layer 13 is addressable independently of the first upper electrodes 10a, 10b.

The upper electrodes 10a,10b,13 of the liquid crystal cell of FIG. 6 may be manufactured by depositing a conductive layer over a suitable substrate (not shown), depositing an insulating layer, and depositing a further conductive layer. The further conductive layer is then patterned, using any suitable patterning technique, to form the patterned electrodes 10a, 10b (and the initially-deposited conductive layer forms the uniform electrode 13). Other layers, for example alignment layers (not shown) may be deposited over the patterned electrodes 10, 10b.

If appropriate voltages are applied to the first upper electrodes 10a, 10b and to the continuous upper electrode layer 13, the effect is that a uniform electric field is applied across the entire liquid crystal layer 9. As a result, the liquid crystal layer is switched uniformly, as shown by the short lines in FIG. 6 which again denote the average liquid crystal molecular direction, and no viewing artefacts arise. In general, a larger voltage will need to be applied to the second upper electrode 13 than to the patterned electrodes 10a, 10b, because of the dielectric loss (voltage drop) that will occur across the insulating layer 14.

As with the liquid crystal cell of FIG. 5, an enhanced private display mode may be obtained by applying different voltages to the upper electrodes 10a, 10b, for example so that the region of the liquid crystal layer corresponding to one upper electrode 10a is switched while the region of the liquid crystal layer corresponding to another upper electrode 10b remains unswitched. The second upper electrode layer 13 may or may not be addressed in the private display mode—if the second upper electrode layer 13 is not addressed the description of the private display mode of FIG. 5 applies whereas if the second upper electrode layer 13 is addressed it may be addressed so that it effectively acts as an extension of one of the upper electrodes 10a,10b (by applying a voltage that is greater than the voltage applied to the relevant upper electrode by an amount required to compensate for dielectric loss across the insulating layer 14) or it may be addressed at a different voltage to both of the upper electrodes 10a,10b (thereby allowing regions of three different liquid crystal states to be obtained).

It should be noted that, in principle, the second upper electrode layer 13 need not be continuous over the entire area of the liquid crystal layer 9, provided that the second upper electrode layer 13 overlies all gaps in the patterned first upper electrode layer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can achieve good optical performance and faster switching of the liquid crystal layer, and hence the present invention can be suitably used for a liquid crystal display, the viewing angle range of which may be controlled.

The invention claimed is:

1. A liquid crystal cell comprising:
a layer of cholesteric liquid crystal material; and a retarder disposed in an optical path through the layer of cholesteric liquid crystal material;
wherein the cholesteric liquid crystal material is switchable between a first state in which it cooperates with the retarder to provide a first viewing angle range and a second state in which it cooperates with the retarder to provide a second viewing angle range which is smaller than the first viewing angle range; and wherein the pitch of the cholesteric liquid crystal material is greater than an intended wavelength of operation of the liquid crystal cell divided by the average refractive index of the liquid crystal:
wherein the layer of cholesteric liquid crystal is disposed between a first electrode layer and a second electrode layer; and wherein a patterned electrode layer is disposed between the layer of cholesteric liquid crystal material and the second electrode layer, so that a patterned switch of the cholesteric liquid crystal material is achieved; and
wherein an electrically insulating layer is located between at least the patterned electrode layer and the second electrode layer, and wherein the patterned electrode layer and the second electrode layer are independently addressable.

2. A liquid crystal cell as claimed in claim 1 wherein the retarder is a fixed retarder.

3. A liquid crystal cell as claimed in claim 1 wherein the retarder is a negative c-plate.

4. A liquid crystal cell as claimed in claim 1 wherein the retarder is a positive c-plate.

5. A liquid crystal cell as claimed in claim 1 wherein the pitch of the cholesteric liquid crystal material is equal to or greater than 500 nm.

6. A liquid crystal cell as claimed in claim 5 wherein the pitch of the cholesteric liquid crystal material is equal to or greater than 700 nm.

7. A liquid crystal cell as claimed in claim 5 wherein the pitch of the cholesteric liquid crystal material is equal to or greater than 1000 nm.

8. A liquid crystal cell as claimed in claim 1 wherein the pitch of the cholesteric liquid crystal material is less than 25 microns.

9. A liquid crystal cell as claimed in claim 1 wherein the twist angle of the cholesteric liquid crystal material is greater than 300°.

10. A liquid crystal cell as claimed in claim 1 wherein the twist angle of the cholesteric liquid crystal material is less than 3600°.

11. A liquid crystal cell as claimed in claim 1 and further comprising an entrance polariser and an exit polariser, wherein the retarder and the layer of cholesteric liquid crystal material are disposed between the entrance polariser and the exit polariser.

12. A liquid crystal cell as claimed in claim 11 wherein the entrance polariser and exit polariser are elliptical polarisers with an ellipticity of greater than zero.

13. A liquid crystal cell as claimed in claim 12 wherein the entrance polariser and exit polariser are circular polarisers.

14. A liquid crystal cell as claimed in claim 13 wherein the entrance polariser and exit polariser are achromatic circular polarisers.

15. A liquid crystal cell as claimed in claim 13 wherein the entrance polariser and exit polariser each comprise a linear polariser and a quarterwave plate.

16. A liquid crystal cell as claimed in claim 12 wherein the handedness of the entrance polariser is opposite to the handedness of the pitch liquid crystal material.

17. A liquid crystal cell as claimed in claim 11 wherein the entrance polariser and exit polariser are linear polarisers.

18. The liquid crystal cell of claim 1, wherein the patterned electrode layer and the second electrode layer are on a common side of the layer of cholesteric liquid crystal material, and both the patterned electrode layer and the second electrode layer apply voltage to the layer of cholesteric liquid crystal material in order to switch the layer of cholesteric liquid crystal material between the first and second states.

* * * * *